(12) United States Patent
Zhao et al.

(10) Patent No.: US 12,457,185 B2
(45) Date of Patent: Oct. 28, 2025

(54) SESSION INFORMATION DISPLAY METHOD AND APPARATUS, AND ELECTRONIC DEVICE

(71) Applicant: Beijing Zitiao Network Technology Co., Ltd., Beijing (CN)

(72) Inventors: Liyue Zhao, Beijing (CN); Bowen Shen, Beijing (CN); Hongze Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/572,762

(22) PCT Filed: Aug. 3, 2022

(86) PCT No.: PCT/CN2022/109966
§ 371 (c)(1),
(2) Date: Dec. 20, 2023

(87) PCT Pub. No.: WO2023/011523
PCT Pub. Date: Feb. 9, 2023

(65) Prior Publication Data
US 2024/0291790 A1    Aug. 29, 2024

(30) Foreign Application Priority Data
Aug. 6, 2021    (CN) .......................... 202110905718.5

(51) Int. Cl.
G06F 15/16    (2006.01)
H04L 9/40    (2022.01)
H04L 51/216    (2022.01)

(52) U.S. Cl.
CPC ............ *H04L 51/216* (2022.05); *H04L 63/08* (2013.01)

(58) Field of Classification Search
CPC .............................. H04L 51/216; H04L 63/08
(Continued)

(56) References Cited

U.S. PATENT DOCUMENTS 10,003,560 B1    6/2018  Perkins et al.
11,012,392 B2 *  5/2021  Hsu ...................... G06F 3/0482
(Continued)

FOREIGN PATENT DOCUMENTS

CN    103797438 A    5/2014
CN    104660483 A    5/2015
(Continued)

OTHER PUBLICATIONS

International Patent Application No. PCT/CN2022/109966; Int'l Search Report; dated Oct. 31, 2022; 2 pages.
(Continued)

*Primary Examiner* — Alan S Chou
(74) *Attorney, Agent, or Firm* — BakerHostetler (57) ABSTRACT

The method including: displaying, in a conversation list of a current user, information of at least one conversation the current user is part of, information of the conversation displayed including a first information set in the corresponding conversation, wherein the conversation comprises a one-to-one conversation of the current user and/or a first group conversation the current user is a group member of; and displaying, in the conversation list, information of at least one second group conversation the current user is not a group member of, information of the second group conversation displayed including a second information set, wherein an amount of information of the second information set is smaller than that of the first information set. The disclosure facilitates the user to quickly get knowledge of a group conversation he/she is not part of and thereby facilitates the user to join the group.

20 Claims, 3 Drawing Sheets

(58) Field of Classification Search
USPC .......................................................... 709/206
See application file for complete search history.

(56) References Cited

U.S. PATENT DOCUMENTS

| | | | |
|---|---|---|---|
| 11,019,001 B1 | 5/2021 | Wu et al. | |
| 2017/0310717 A1* | 10/2017 | Staples | H04L 51/046 |
| 2017/0351385 A1 | 12/2017 | Ertmann et al. | |
| 2018/0359292 A1* | 12/2018 | Chen | H04L 65/403 |
| 2020/0402006 A1* | 12/2020 | Margalit | H04M 1/72403 |
| 2021/0168110 A1* | 6/2021 | Marmar | G06F 40/30 |
| 2022/0198056 A1* | 6/2022 | Nigro | H04L 51/063 |

FOREIGN PATENT DOCUMENTS

| | | |
|---|---|---|
| CN | 105553817 A | 5/2016 |
| CN | 106453066 A | 2/2017 |
| CN | 110113489 A | 8/2019 |
| CN | 113010254 A | 6/2021 |
| CN | 113179206 A | 7/2021 |

OTHER PUBLICATIONS

Written Opinion for International Application No. PCT/CN2022/109966, mailed Oct. 31, 2022, 07 Pages.

\* cited by examiner

SESSION INFORMATION DISPLAY METHOD AND APPARATUS, AND ELECTRONIC DEVICE

CROSS-REFERENCE TO RELATED APPLICATION(S)

This application is a U.S. National Stage Application of PCT Application Serial No. PCT/CN2022/109966 filed Aug. 3, 2022, which claims priority to Chinese Application No. 202110905718.5 titled "Session Information Display Method and Apparatus, and Electronic Device" filed on Aug. 6, 2021, the disclosures of which are incorporated herein by reference in their entities.

FIELD

The disclosure relates to internet technologies, and more particularly relates to a method of displaying conversation information, an apparatus therefor, and an electronic device.

BACKGROUND

With advancement in information communication technologies, a user may communicate information with a contact via an instant messaging application.

A user may communicate information one-to-one with a contact, which is referred to as a one-to-one conversation. The user may also join a group to communicate information with multiple other contacts in the group.

SUMMARY

This Summary is provided to briefly introduce an idea of the disclosure; this idea will be described in detail in the example embodiments infra. The Summary is not intended to identify key or essential features of the technical solution sought for protection, not intended to limit the scope of the technical solution sought for protection.

Embodiments of the disclosure provide a method of displaying conversation information, an apparatus therefor, and an electronic device.

In a first aspect, embodiments of the disclosure provide a method of displaying conversation information, the method comprising: displaying, in a conversation list of a current user, information of at least one conversation the current user is part of, information of the conversation displayed including a first information set in the corresponding conversation, wherein the conversation comprises a one-to-one conversation of the current user and/or a first group conversation the current user is a group member of; and displaying, in the conversation list, information of at least one second group conversation the current user is not a group member of, information of the second group conversation displayed including a second information set, wherein an amount of information of the second information set is smaller than that of the first information set.

In a second aspect, embodiments of the disclosure provide an apparatus for displaying conversation information, comprising: a first displaying unit configured to display, in a conversation list of a current user, information of at least one conversation the current user is part of, information of the conversation displayed including a first information set in the corresponding conversation, wherein the conversation comprises a one-to-one conversation of the current user and/or a first group conversation the current user is a group member of; and display, in the conversation list, information of at least one second group conversation the current user is not a group member of, information of the second group conversation displayed including a second information set, wherein an amount of information of the second information set is smaller than that of the first information set.

In a third aspect, embodiments of the disclosure provide an electronic device, comprising: one or more processors; and a storage device having one or more programs stored thereon; wherein when the one or more programs are executed by the one or more processors, the one or more processors are caused to perform the method of displaying conversation information according to the first aspect.

In a fourth aspect, embodiments of the disclosure provide a computer-readable medium with a computer program stored thereon, wherein the program, when being executed by a processor, performs the steps of a method of displaying conversation information according to the first aspect.

BRIEF DESCRIPTION OF THE DRAWINGS

Through the following detailed description of the example embodiments of the disclosure with reference to the accompanying drawings, the above and other objectives, features, and advantages of the disclosure will become more apparent. Throughout the accompanying drawings, like or similar reference numerals represent same or identical elements. It is understood that the drawings are schematic, so that the components and elements are not drawn with exact scales.

DETAILED DESCRIPTION OF EMBODIMENTS

Hereinafter, embodiments of the disclosure will be described in more detail with reference to the accompanying drawings. Although some example embodiments of the disclosure have been illustrated in the drawings, it is understood that the disclosure may be implemented in various forms, not limited to the example embodiments depicted herein; instead, provision of these example embodiments is intended for a more thorough and comprehensive understanding of the disclosure. It is understood that the accompanying drawings and example embodiments provided herein are only for illustrative purposes, not for limiting the scope of protection of the disclosure.

It is understood that the various steps recited in method embodiments of the disclosure may be performed sequentially and/or concurrently. In addition, the method embodiments may comprise additional steps and/or omit some steps illustrated. The scope of the disclosure is not limited thereto.

The term "comprise" and its variants used herein refer to an open inclusion, i.e., "including, but not limited to." The term "based on" refers to "at least partially based on." The term "one embodiment" refers to "at least one embodiment"; the term "another embodiment" refers to "at least one further embodiment"; and the term "some embodiment" refers to "at least some embodiments." Relevant definitions of other terms will be provided in the description infra.

It is noted that concepts such as "first" and "second" indicated herein are used only for distinguishing different apparatuses, modules, or units, not intended for limiting the sequence of the functions executed by such apparatuses, modules or units or limiting their mutual dependencies.

It is noted that the modifier "a/an" indicated herein is illustrative, not limitative. Those skilled in the art would understand that except otherwise indicated in the context, this modifier shall be understood as "one or more." The term "A and/or B" indicated herein represent three parallel circumstances: A; B; and A and B, i.e., at least one of A and B.

The names of interactive messages or information between a plurality of apparatuses in the embodiments of the disclosure are only for illustrative purposes, not for limiting the scope of such messages or information.

Figure 1A:
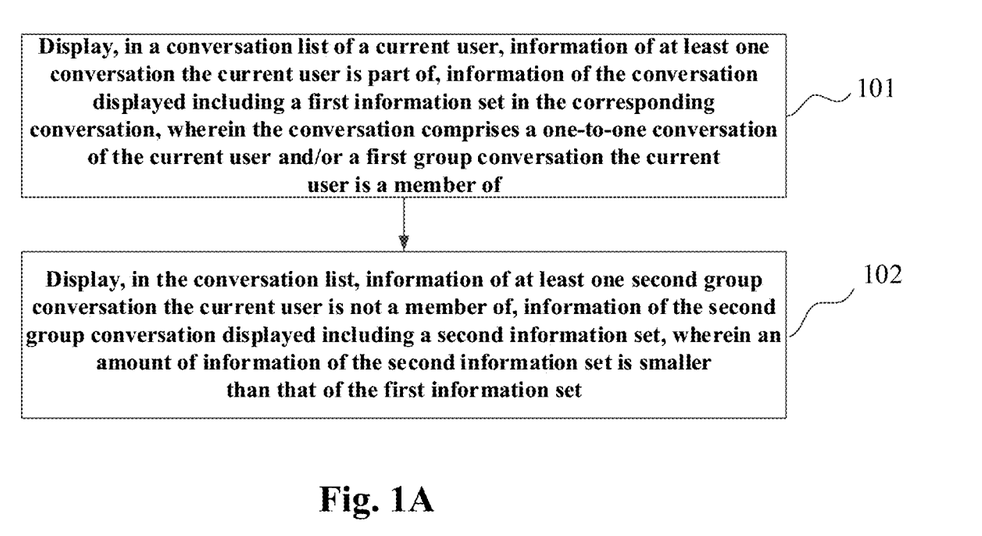
FIG. 1A is a flow diagram of a method of displaying conversation information according to some embodiments of the disclosure.

Please refer to FIG. 1A, which illustrates a flow diagram of a method of displaying conversation information according to some embodiments of the disclosure. As illustrated in FIG. 1A, a method of displaying conversation information comprises steps of:

Step 101: information of at least one conversation the current user is part of is displayed in a conversation list of a current user, the information of the conversation displayed including a first information set in the corresponding conversation; wherein the conversation includes a one-to-one conversation of the current user and/or a first group conversation the current user is a group member of; and Step 102: information of at least one second group conversation the current user is not a group member of is displayed in the conversation list, the information of the second group conversation displayed including a second information set; wherein an amount of information of the second information set is smaller than that of the first information set.

In this embodiment, an acting body of the method of displaying conversation information may be a user's terminal device, or may be an instant messaging client installed on the user's terminal device, or may be a server. The instant messaging client may be a client including a standalone instant messaging application, or a client including other types of instant messaging-enabled software, e.g., a client which includes an office suite integrating instant messaging, meeting, calendar, and document features, or if a client including an application for viewing short videos or graphic news has an instant messaging feature, the client also amounts to the instant messaging client according to the disclosure.

The current user may log on the instant messaging application. After the current user logs on the instant messaging application, an information interaction interface may be displayed. The information interaction interface may display a conversation list.

The conversation list may include information of a conversation the current user is part of. The conversation the current user is part of includes a one-to-one conversation and a first group conversation. The one-to-one conversation includes a conversation in which the current user communicates information one-to-one with a contact. The first group conversation the current user is part of refers to a group conversation the current user is a group member of. In the first group conversation, the current user may have ever sent a message or may have never sent a message.

For the conversation the user is part of, the information of the conversation displayed includes a first information set in the corresponding conversation.

The second group conversation refers to a group conversation the user is not a group member of.

For the second group conversation, the conversation list may display a second information set. Here, an amount of information of the second information set is smaller than that of the first information set.

In some alternative implementations, the first information set includes information of a message of the corresponding conversation the current user is part of, and the second information set does not include information of a message in the corresponding second group conversation.

As a schematic illustration, for a one-to-one conversation, the first information set here may include information of the contact corresponding to the one-to-one conversation and information of part of a message of the one-to-one conversation. For the first group conversation, the first information set here includes a first group identifier and information of part of a message in the first group conversation. Exemplarily, the information of part of a message in the first group conversation may include digest information of a latest message in the first group conversation, or part of the latest message in the first group conversation.

Figure 1B:
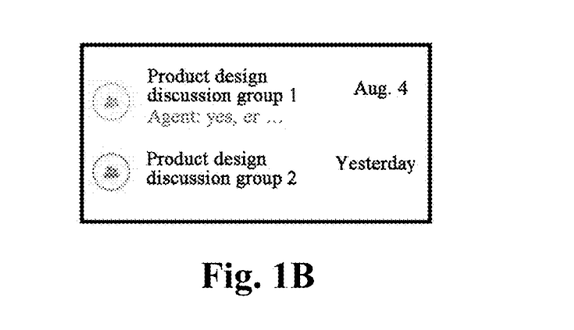
FIG. 1B is an exemplary schematic diagram of a method of displaying conversation information according to the disclosure.

For example, FIG. 1B is an exemplary schematic diagram of a method of displaying conversation information according to the disclosure. FIG. 1B illustrates part of a screenshot of a conversation list of the current user, the screenshot including information of two group conversations. The first group conversation named "Product Design Discussion Group 1" is a group conversation the current user is a group member of; the first information set of the first group conversation displayed includes: group name, group picture, digest information of the latest message in the group (Agent: Received, Er . . . ), and send_time of the latest message. The second group conversation named "Product Design Discussion Group 2" is a group conversation the current user is not a group member of, and the second information set of the second group conversation displayed includes: group name, group picture, and send_time of the latest message in the group conversation. Since the current user is not a group member of the second group conversation, messages in the group conversation are invisible to the current user; however, since the second group conversation grants a group-visible permission to the current user, the current user may be aware of presence of this group conversation, and if he/she feels interested in the group conversation, he/she may apply for joining the group conversation.

A second information set of a second group conversation may not include information of a message in the second group conversation. As a schematic illustration, the second information set of the second group conversation may only include an identifier of the second group conversation.

It is noted that step 101 and step 102 described supra may be performed concurrently.

The method of displaying conversation information provided according to this embodiment may be applied to a team application scenario. In some example implementations, in an instant messaging (IM) system, a fixed group of contacts are first selected as a team member set to set up a team; in the IM interface, a user is aware of presence of the team via the team identifier. The team is associated with at least one group based on the team member set. The group here refers to a carrier bearing interactive information between multiple people in the IM system; since group conversation is a known technology, it will not be detailed here. As such, a concept of Team is provided in the IM. The Team refers to a group of relatively stable members. A user may create a new team to invite members to join, or may promote an existing group as a Team.

Then, in some embodiments, the conversation list is a team conversation list displaying group conversation information associated with the team the current user is a group member of; wherein the team has a team member set and is associated with at least one group, each group in the associated at least one group includes at least part of members in the team member set. For information of each group conversation displayed in the team conversation list: if the current user is a group member of the group, the group conversation information displayed includes information of a message in the group; if the current user is not a group member of the group, the group conversation information displayed does not include information of a message in the group.

In some embodiments, the team conversation list further displays one-to-one conversation information between the current user and a team member, the one-to-one conversation information displayed including information of a message in the one-to-one conversation.

In some embodiments, the team is associated with at least one group conversation. The associated group conversation includes a first group conversation and a second group conversation. A team member set of the first group conversation is equal to the team member set of the team, so that messages in the first group conversation are open to all team members; a team member set of the second group conversation is a proper subset of the team member set of the team, so that messages in the second group conversation are hidden from those who are not members of the second group conversation.

Optionally, respective team members of the team may not come from a same unit.

In these application scenarios, the conversation list may be a conversation list displayed in a team message display interface. The conversation list may display respective first information sets in the first group conversation and the third group conversation, and a second information set in the second group conversation the current user is not a group member of. To the current user, after the current user leaves the third group conversation, the third group conversation changes to be the second group conversation. Or to the current user, before the current user joins the third group conversation, the third group conversation is the previously second group conversation.

After the current user becomes a group member of the second group conversation, to the current user, the second group conversation may be changed to the third group conversation, so that the first information set of the third group conversation may be displayed in the conversation list of the current user.

In these application scenarios, the method of displaying conversation information further comprises: displaying, in the conversation list, information of a third group conversation the current user has been a group member of, the information of the third group conversation including a first information set corresponding to the third group conversation.

As a schematic illustration, Team A may be associated with First Group Conversation B, and Second Group Conversation C the current user is currently not a group member of, and Third Group Conversation D the current user is has been a group member of. The current user is a group member of Team A. Since the team member set of Team A is consistent with the team member set of First Group Conversation B, the current user is also a group member of First Group Conversation B. It is seen that, the conversation list of the team may show the first information set of First Group conversation B, the first information set of Third Group conversation D, and the second information set of Second Group conversation C the current user is not a group member of.

In the team application scenario, the team not only includes a first group conversation the messages of which are open to all team members but also includes a second group conversation the messages of which are not open to those who are not members of the second group conversation. In addition, in the team application scenario, the second information set of the second group conversation may also be displayed to a team member who is not a group member of the second group, so that the team member which is not a group member of the second group conversation may be aware of presence of the second group conversation; in this way, the team member who is not a group member of the second group conversation gets knowledge of the structural information of the team.

In some other application scenarios, a group member of the second group conversation has a preset association relationship with the current user.

In some implementations, the preset relationship may include, for example, a relationship that the current user is a contact of a plurality of group members in the second group conversation, and the plurality of group members in the second group conversation are contacts of the current user.

In some other implementations, an attribute value of an organization attribute of the group members is identical to an attribute value of an organization attribute of the current user.

Identicality between the attribute values of the organization attributes indicates that the group members and the current user are from a same organization. As a schematic illustration, the same organization may refer to a same unit. As another schematic illustration, the same organization may refer to a same department in a same unit.

In these application scenarios, the conversation list may display a conversation list including an information flow of instant messaging information. The conversation list may display information of a conversation the current user is part of, the information of the conversation the current user is part of including one-to-one conversation information and/or first group conversation information. The information of the conversation the current user is part of may include a first information set. Additionally, in these application scenarios, the conversation list may also display information of a second group conversation the current user is not a group member of. The information of the second group conversation includes a second information set. The information set may include a group conversation identifier of the second group conversation.

In this way, the current user may view, in the conversation list, the information of the second group conversation participated in by other organizational members from the same unit, so that the current user gets knowledge of the information of the group conversation participated in by other organizational members. If the current user feels interested in the group, he/she may apply for joining, so that people interested in a same issue may gather under a same group.

For example, Department c of Unit a includes Members e, f, d. Group Conversation R may be open to the members of Department c. Members e and f are existing members of Group Conversation R. Supposing the current user refers to Member e or f, Group Conversation R may be a first group conversation, so that the first information set of Group Conversation R may be displayed in the conversation list of Member e or Member f.

Member d is not a group member of Group Conversation R. If the current user refers to Member d, Group Conversation R may be a second group conversation, so that the second information set of Group Conversation R may be displayed in the conversation list of Member d.

Member d may execute, in the conversation list, a join operation of joining Group Conversation R, whereby he/she joins Group Conversation R. After joining Group Conversation R, Member d becomes a group member of Group Conversation R. For Member d, Group Conversation R changes from the second group conversation to the first group conversation, so that the first information set of Group Conversation R may be displayed in the conversation list of Member d.

The method of displaying conversation information provided according to embodiments of the disclosure comprises: displaying, in a conversation list of a current user, information of at least one conversation the current user is part of, information of the conversation displayed including a first information set in the corresponding conversation, wherein the conversation comprises a one-to-one conversation of the current user and/or a first group conversation the current user is a group member of; and displaying, in the conversation list, information of at least one second group conversation the current user is not a group member of, information of the second group conversation displayed including a second information set, wherein an amount of information of the second information set is smaller than that of the first information set, so that the conversation list not only displays the information of a conversation the user is part of, but also displays the information of a group conversation the user is not part of. Compared with conventional technologies in which only the information of the conversation the user is part of is displayed, the solution provided herein facilitates the user to quickly get knowledge of a group conversation he/she is not part of, thereby facilitating the user to join the group.

Figure 2:
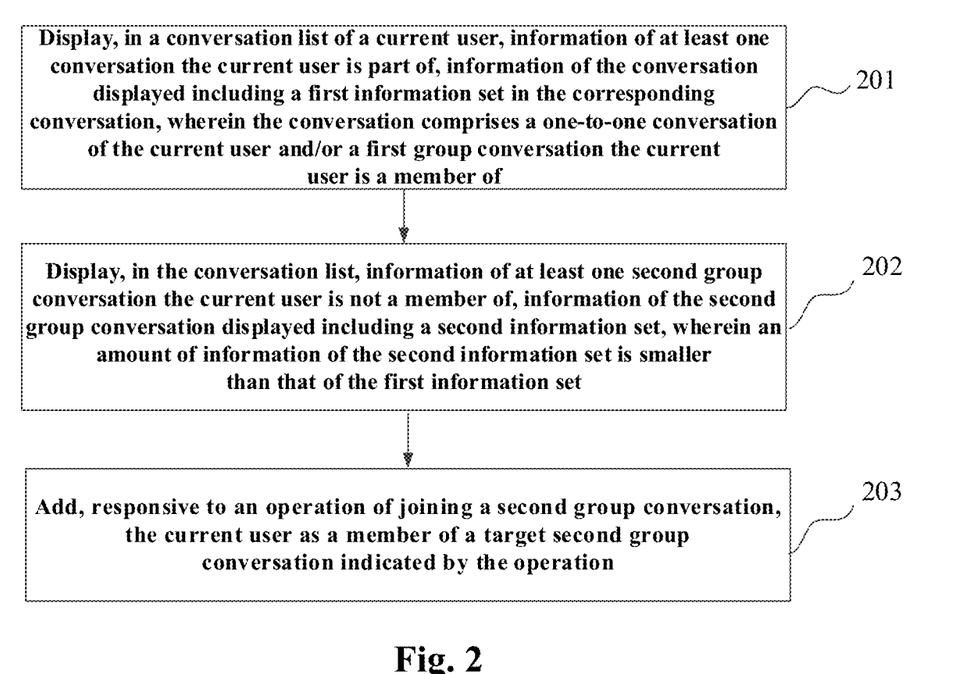
FIG. 2 is a flow diagram of a method of displaying conversation information according to some other embodiments of the disclosure.

Please refer to FIG. 2, which is a flow diagram of a method of displaying conversation information according to some other embodiments of the disclosure. As illustrated in FIG. 2, the method of displaying conversation information comprises steps of:

Step S201: information of at least one conversation the current user is part of is displayed in a conversation list of the current user, the information of the conversation displayed including a first information set in a corresponding conversation, wherein the conversation includes a one-to-one conversation of the current user and/or a first group conversation the current user is a group member of; and Step S202: information of at least one second group conversation the current user is not a group member of is displayed in the conversation list, the information of the second group conversation displayed including a second information set, wherein an information amount of the second information set is smaller than that of the first information set.

Step S201~Step S202 may refer to depictions in relevant parts of the embodiment illustrated in FIG. 1, which will not be repeated here.

Step S203: in response to an operation of joining a second group conversation, the current user is added as a group member of a target second group conversation indicated by the operation.

The operation of joining a second group conversation refers to an operation of sending, to an instant messaging application via speech or text, an indication of adding the current user to a second group conversation.

In some optional implementations, Step S203 comprises: adding, based on a preset operation executed by the current user on a group conversation join control displayed indicative of joining the target second group conversation, the current user to the target second group conversation.

The group conversation join control may comprise a control identifier. The control identifier includes, but is not limited to, text, symbol, letter, and/or image.

The preset operation includes, but is not limited to, a selection operation such as clicking and touching.

In some application scenarios, the group conversation join control and the information of the target second group conversation displayed in the conversation list are simultaneously displayed.

In these application scenarios, the group conversation join control may be displayed in a display area where the information of the target second group conversation is displayed. For example, the group conversation join control may be displayed at an edge of the display area.

In these application scenarios, by displaying the group conversation join control and the information of the target second group conversation simultaneously, the current user may see the group conversation join control when browsing the information of the target second group conversation, eliminating a need of additional operation to invoke the group conversation join control. This may simplify the current user's operation on joining the target second group conversation, facilitating the current user to join the target second group conversation.

In some other application scenarios, the group conversation join control is displayed based on a preset operation executed by the current user on the information of the target second group conversation.

The preset operation for example may include for example a clicking or touching operation on the target second group conversation. The clicking operation for example may be a clicking operation, and the touching operation for example includes a touch with a touch duration satisfying a preset duration requirement.

In these application scenarios, when the current user intends to join the target second group conversation, the current user may execute the preset operation. Displaying the group conversation join control upon receipt of the preset operation facilitates the current user to join the target second group conversation, which, on one hand, may avoid information noise to the user caused by displaying the group conversation join control when the user does not have such an intention, and on the other hand, may avoid occurrence of mistakenly joining the target second group conversation caused by the user's unintended operation.

In some optional implementations, Step S203 comprises the following sub-steps:

receiving the preset operation executed by the current user indicative of joining the target second group conversation, and sending a join request to a server, so that the server adds the current user as a group member of the target second group conversation, wherein the joint request includes user information of the current user and group conversation information of the target second group conversation; and receiving feedback information of successful add returned from the server responsive to the join request, and listing, based on the feedback information, the current user as a group member of the target second group conversation.

In some application scenarios, adding, by the server, the current user as a group member of the target second group conversation, comprises: directly adding the current user as a group member of the target second group conversation, and sending group member update information to respective members of the target second group conversation.

That is, in these application scenarios, upon receipt of the join request, the server may directly add the user as a group member of the target second group conversation, and then sends group member update information to respective members of the target second group conversation, so that the group member information is updated at clients of respective members of the target second group conversation.

In these optional implementations, the instant messaging application client used by the current user may display, in the conversation list, information of at least one conversation the current user is part of, and information of at least one second group conversation the current user is not a group member of. The current user may execute the preset operation at the client. The client may send the join request to the server. Upon receipt of the join request, the server adds, at the server, based on user information and the group conversation information in the join request, the current user as a group member of the target second group conversation. Upon successful adding, the server may send the feedback information to the client, indicating that the server has successfully added the current user as a group member of the target second group conversation. Upon receipt of the feedback information, the client may list, at the client, the current user as a group member of the target second group conversation.

In some other optional implementations, Step S203 comprises the following steps:

displaying, responsive to an operation of the current user on joining the target second group conversation, a verification information input box;

sending, to a target object, the verification information inputted by the current user via the verification information input box; and adding, responsive to receipt of authentication success information returned from the target object with respect to the verification information, the current user as a group member of the target second group conversation.

In these optional applications, upon receipt of the operation of adding the current user to the target second group conversation, a verification information input box may be displayed. The user may input pre-agreed verification information into the verification information input box. The client may send the verification information to a target object.

In some application scenarios, the target object here may refer to a group member of the target second group conversation who has a preset administration function. Upon receipt of the verification information, the member with the preset administration function may authenticate whether the verification information is verification information satisfying a preset condition, e.g., determining whether the verification information is preset verification information. In a case of a positive authentication result, the authentication passes; otherwise, the authentication fails. If the authentication passes, the client of the target object may send information of authentication pass to the client of the current user. After the client of the current user receives the information of authentication pass, the current user may be added as a group member of the target second group conversation.

In some application scenarios, the target object here may be a server providing services to the instant messaging application. The server may be pre-granted a permission to authenticate the user applying for joining the second group conversation. Upon receipt of the authentication information, the server may authenticate whether the verification information is verification information satisfying a preset requirement, e.g., determining whether the verification information is preset verification information. In a case of a positive authentication result, the authentication passes; otherwise, the authentication fails. If the authentication passes, the server may send information of authentication pass to the client of the current user. Upon receipt of the authentication pass information, the client of the current user may add the current user as a group member of the target second group conversation.

Compared with the embodiment illustrated in FIG. 1, this embodiment places an emphasis on the step in which the current user becomes a group member of the second group, thereby facilitating the user to join the second group.

Figure 3:
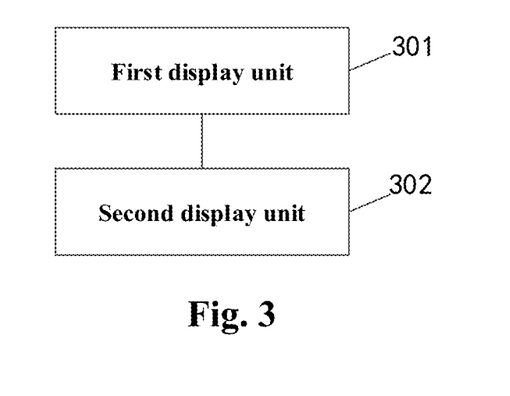
FIG. 3 is a structural schematic diagram of an apparatus for displaying conversation information according to one embodiment of the disclosure.

Further referring to FIG. 3, to perform the method illustrated in various figures noted supra, the disclosure provides an example apparatus for displaying conversation information. This apparatus embodiment corresponds to the method embodiment illustrated in FIG. 1. The apparatus may be specifically applied in various electronic devices.

As illustrated in FIG. 3, the apparatus for displaying conversation information according to the disclosure comprises a first display unit 301 and a second display unit 302, the first display unit 301 being configured to display, in a conversation list of a current user, information of at least one conversation the current user is part of, information of the conversation displayed including a first information set in the corresponding conversation, wherein the conversation comprises a one-to-one conversation of the current user and/or a first group conversation the current user is a group member of; and a second display unit 302 being configured to display, in the conversation list, information of at least one second group conversation the current user is not a group member of, information of the second group conversation displayed including a second information set, wherein an amount of information of the second information set is smaller than that of the first information set.

In this embodiment, specific processing and achieved effects of the first display unit 301 and the second display unit 302 of the apparatus for displaying conversation information may refer to relevant depictions of step 101 and step 102 in the embodiment corresponding to FIG. 1, which will not be repeated here.

In some optional implementations, the first information set includes information of a message of a corresponding conversation the current user is part of, and the second information set does not include information of a message in a corresponding second group conversation.

In some optional implementations, the apparatus for displaying conversation information further comprises a member adding unit (not shown), the member adding unit being configured to: add, responsive to an operation of joining a second group conversation, the current user as a group member of a target second group conversation indicated by the operation of joining the second group conversation.

In some optional implementations, the member adding unit is further configured to: add, based on a preset operation executed by the current user on a group conversation join control displayed indicative of joining the target second group conversation, the current user to the target second group conversation.

In some optional implementations, the group conversation join control and the information of the target second group conversation displayed in the conversation list are simultaneously displayed; or the group conversation join control is displayed based on the preset operation executed by the current user on the information of the target second group conversation.

In some optional implementations, the member adding unit is further configured to: receive the preset operation executed by the current user indicative of joining the target second group conversation, and send a join request to a server, so that the server adds the current user as a group member of the target second group conversation, wherein the joint request includes user information of the current user and group conversation information of the target second group conversation; and receive feedback information of successful add returned from the server responsive to the join request, and list, based on the feedback information, the current user as a group member of the target second group conversation.

In some optional implementations, adding, by the server, the current user as a group member of the target second group conversation, comprises: directly adding the current user as a group member of the target second group conversation, and sending group member update information to respective members of the target second group conversation.

In some optional implementations, the member adding unit is further configured to: display, responsive to an operation of the current user on joining the target second group conversation, a verification information input box; and send, to a target object, the verification information inputted by the current user via the verification information input box; and add, responsive to receipt of authentication success information returned from the target object with respect to the verification information, the current user as a group member of the target second group conversation.

In some optional implementations, the second display unit 302 is further configured to: display, in the conversation list, information of a third group conversation the current user is has been a group member of, the information of the third group conversation including a first information set corresponding to the third group conversation; for the current user, after the current user leaves the third group conversation, the third group conversation changes to be the second group conversation; or, before the current user joins the third group conversation, the third group conversation is the second group conversation; the first group conversation and the second group conversation are both associated with a same team, and the conversation list is a conversation list displayed in a message displaying interface of the team; since a group member set of the first group conversation is equal to a team member set of the team, messages of the first group conversation are open to all team members; the group member sets of the second group conversation and the third group conversation complete sets or true subsets of the team member set of the team, messages in the second group conversation and the third group conversation are hidden from those team members who are not members of respective group conversations.

In some optional implementations, a preset association relationship is present between members of the second group conversation and the current user.

In some optional implementations, the preset association relationship comprises: identicality between an attribute value of an organizational attribute of the group members of the second group and an attribute value of an organizational attribute of the current user.

Figure 4:
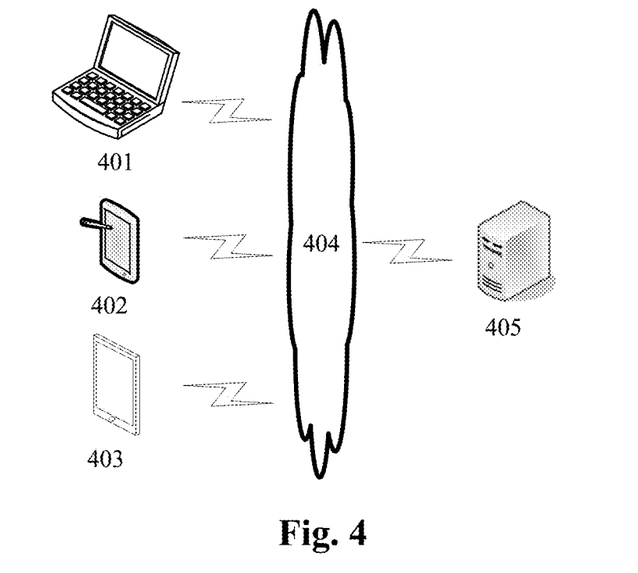
FIG. 4 is an exemplary system architecture in which a method of displaying conversation information according to one embodiment of the disclosure may be applied.

Please refer to FIG. 4, which is an exemplary system architecture in which a method of displaying conversation information according to one embodiment of the disclosure may be applied.

As illustrated in FIG. 4, the system architecture may comprise terminal 401, 402, 403, network 404, and server 405. The network 404 serves as a medium for providing a communication link between the terminal 401, 402, 403 and the server 405. The network 404 may include various types of connection, e.g., wired, wireless communication link or an optical fiber cable, etc.

The terminal 401, 402, 403 may interact with the server 405 via the network 404 so as to receive or transmit messages. The terminal 401, 402, 403 may be installed with various kinds of client applications, e.g., a webpage browser application, a search application, and a news application. The client application in the terminal 401, 402, and 403 may receive user instructions and perform corresponding functions based on the user instructions, e.g. displaying an information flow of instant messaging according to the user instructions.

The terminal 401, 402, 403 may be hardware or software. In a case that the terminal 401, 402, 403 is hardware, it may refer to various kinds of terminal devices having a display screen and supporting webpage browsing, including, but is not limited to, a smart phone, a tablet computer, an electronic book reader, a MP3 player (Moving Picture Experts Group Audio Layer III) player, a MP4 (Moving Picture Experts Group Audio Layer IV) player, a laptop computer, and a desktop computer, etc. In a case that the terminal 401, 402, 403 is software, it may be installed in the electronic devices noted supra. The terminal 401, 402, 403 may be embodied as multiple pieces of software or software modules (e.g., software or software modules for providing distributed services), or may be embodied as a standalone piece of software or software module. The disclosure is not limited thereto.

The server 405 may provide various kinds of services, e.g., receiving the information transmitted by the terminal 401, 402, 403, and forwarding the information to other terminals.

It is noted that the method of displaying conversation information provided according to embodiments of the disclosure may be performed by a terminal; correspondingly, the apparatus for displaying conversation information may also be provided in the terminal 401, 402, 403. In addition, the method of displaying conversation information provided according to embodiments of the disclosure may also be executed by the server 405; correspondingly, the apparatus for displaying conversation information may be provided in the server 405.

It is noted that, the number of terminals, networks, and servers illustrated in FIG. 4 are only schematic. There may be provided with any number of terminals, networks, and servers dependent on implementation requirements.

Hereinafter, refer to FIG. 5, which illustrates a schematic diagram of a basic structure of an electronic device according to embodiments of the disclosure. The electronic device herein generally refers to a hardware terminal or server (e.g., the terminal device or server in FIG. 4). The terminal device referred to in the embodiments of the disclosure may include, but is not limited to, a mobile terminal such as a mobile device, a handheld or laptop device, a digital broadcast receiver, a PDA (Personal Digital Assistant), a PAD (Tablet), a PMP (Portable Media Player), or a vehicle-mounted terminal (e.g., a vehicle-mounted navigation terminal), and a fixed terminal such as a digital TV or a desktop computer. The electronic device illustrated in FIG. 5 is only exemplary, which should not constitute any limitation to the functions and scope of use of the embodiments of the disclosure.

Figure 5:
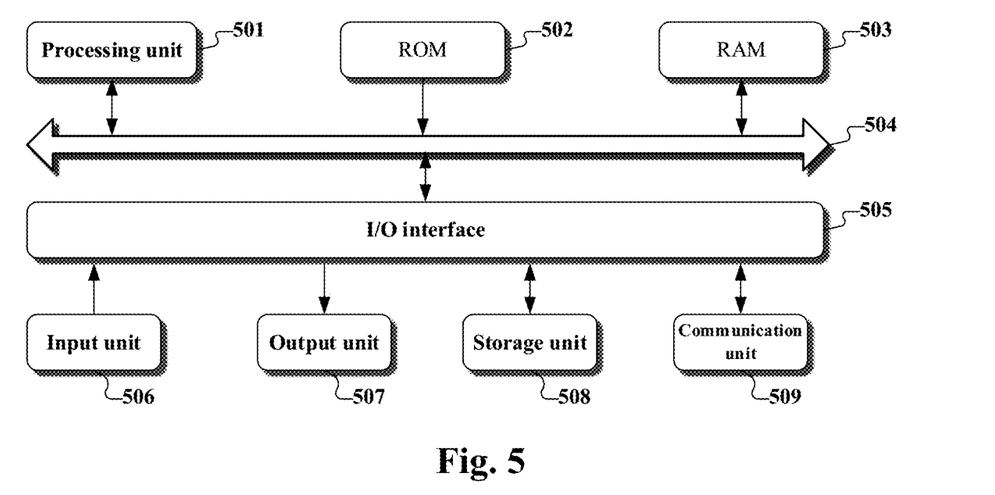
FIG. 5 is a schematic diagram of a basic structure of an electronic device according to embodiments of the disclosure.

As illustrated in FIG. 5, the electronic device may comprise a processing unit (e.g., a Center Processing Unit, a Graphic Processing Unit, etc.) 501, which may execute various suitable actions and processing based on the program stored in a read-only memory (ROM) 502 or a program loaded in the random-access memory (RAM) 503 from a storage unit 508. The RAM 503 can also store all kinds of programs and data necessary to operation of the electronic device 500. The processing device 501, ROM 502 and RAM 503 are interconnected to each other via a bus 504. The input/output (I/O) interface 505 is also connected to the bus 504.

Generally, the following devices may be connected to the I/O interface 505: an input unit 506 including, e.g., a touch screen, a touch pad, a keypad, a mouse, a camera, a microphone, an accelerometer, or a gyroscope; an output unit 507, e.g., a LCD (Liquid Crystal Display), a loudspeaker, or a vibrator; a storage unit 508 such as a magnetic tape, a hard disk; and a communication unit 509. The communication unit 509 allows the electronic device 500 to exchange information/data with other devices via wireless or cable communication. Although the electronic device 500 comprising various components is shown in FIG. 5, it is understood that it is not required to implement or possess all of the illustrated components. Alternatively, more or less components may be implemented or possessed.

Particularly, according to the embodiments of the disclosure, the processes described with reference to the above flow diagram may be implemented as computer software programs. For example, embodiments of the disclosure comprise a computer program product comprising a computer program carried on the computer-readable medium, the computer program including program codes for performing the methods illustrated in the flow diagram. In such embodiments, the computer program may be downloaded and installed from the network via the communication unit 509, or installed from the storage unit 508, or installed from the ROM 502. When the computer program is executed by the processing unit 501, the actions defined by the methods according to the embodiments of the disclosure are implemented.

It is noted that, the computer-readable medium described supra may be a computer-readable signal medium or a computer-readable storage medium or any combination of the above. The computer-readable storage medium for example may be, but is not limited to, electric, magnetic, optical, electro-magnetic, infrared or semiconductor system, apparatus or device, or any combination thereof. More specific examples of the computer-readable storage medium include, but are not limited to, an electric connection via one or more wires, a portable computer magnetic disk, hard disk, random access memory (RAM), read-only memory (ROM), erasable programmable read-only memory (EPROM or flash memory), optical fiber, portable compact-disc read-only storage medium (CD-ROM), optical storage device, magnetic storage device, or any appropriate combination thereof. In the disclosure, the computer-readable storage medium may refer to any tangible medium including or storing a program that can be used by an instruction executing system, apparatus or device or used by a combination thereof. However, in the disclosure, the computer-readable signal medium may include data signals in the base band or propagated as a part of carrier, in which the computer-readable program codes are carried. This propagated data signals may take on various forms, including, but not limited to, electromagnetic signals, optical signals, or any suitable combination thereof. The computer-readable signal medium may also be any computer-readable medium other than the computer-readable storage medium, which computer-readable signal medium may transmit, propagate, or transfer a program used by the instruction executing system, apparatus or device, or used in combination therewith. The program code stored on the computer-readable medium may be transmitted via any appropriate medium including, but is not limited to, wires, cables, RFs (Radio Frequencies), etc., or any appropriate combination thereof.

In some embodiments, the client and the server may communicate using any currently known or future developed network protocols such as HTTP (HyperText Transfer Protocol), and may be interconnected with a digital data communication (e.g., communication network) of any form or medium. Examples of the communication network include a local area network ("LAN"), a wide area network ("WAN"), a network of networks (e.g., the Internet), and a peer-to-peer network (e.g., an ad hoc peer-to-peer network), and any currently known or future developed network.

The computer-readable medium may be included in the electronic device, or may be standalone, without being installed in the electronic device.

The computer-readable medium carries one or more programs; when the one or more programs are executed by the electronic device, the electronic device is caused to: display, in a conversation list of a current user, information of at least one conversation the current user is part of, information of the conversation displayed including a first information set in the corresponding conversation, wherein the conversation comprises a one-to-one conversation of the current user and/or a first group conversation the current user is a group member of; and display, in the conversation list, information of at least one second group conversation the current user is not a group member of, information of the second group conversation displayed including a second information set, wherein an amount of information of the second information set is smaller than that of the first information set.

The computer-program code for performing the operations of the disclosure may be compiled with one or more programming languages or a combination thereof; the programming languages comprise object-oriented programming languages, e.g., Java, Smalltalk, C++, and further comprise traditional procedural programming languages, such as "C" language or similar programming languages. The program codes can be executed completely on the user computer, partially on the user computer, as an independent software package, partially on the user computer and partially on the remote computer, or completely on the remote computer or server. In a scenario where a remote computer is involved, the remote computer can be connected to the user computer via any type of network, including local area network (LAN) and wide area network (WAN), or to the external computer (e.g., connected via Internet using the Internet service provider).

The flow diagrams and block diagrams in the drawings illustrate system architecture, functions and operations that may be implemented by the system, method and computer program product according to various embodiments of the disclosure. In this regard, each block in the flow diagram or block diagram can represent a module, a program snippet, or a part of code, wherein the module, the program snippet, or the part of code includes one or more executable instructions for performing specified logic functions. It is also noted that, in some alternative implementations, the functions indicated in the blocks can also occur in an order different from those indicated in the drawings. For example, two successively represented blocks can be actually executed in parallel and sometimes in a reverse order dependent on the concerned functions. It is also noted that, each block in the block diagram and/or flow diagram and a combination of the blocks in the block diagram and/or flow diagram may be implemented by a dedicated hardware-based system for executing specified functions or actions, or implemented by a combination of dedicated hardware and computer instructions.

The units described in the embodiments of the disclosure may be implemented in a software manner or in a hardware manner, wherein the names of the units do not constitute limitation to the unit per se in some circumstances.

The functions described herein may be executed at least partially by one or more hardware logic components. For example, an example hardware logic component that may be used includes, but is not limited to, a field programmable gate array (FPGA), an application-specific integrated circuit (ASIC), an application-specific standard product (ASSP), a system-on-chip (SOC), and a complex programmable logic device (CPLD), etc.

Within the context of the present disclosure, the machine-readable medium may be any tangible medium including or storing programs for or related to the instruction execution system, apparatus, or device. The machine readable medium may include, but is not limited to, electronic, magnetic, optical, electro-magnetic, infrared or semiconductor system, apparatus or device, or any combination thereof. More specific examples of the machine-readable storage medium include an electric connection via one or more wires, a portable computer magnetic disk, a hard disk, a random access memory (RAM), a read-only memory (ROM), an erasable programmable read-only memory (EPROM or flash memory), an optical storage device, a magnetic storage device, or any appropriate combination thereof.

The method of displaying conversation information, the apparatus therefor, and the electronic device according to embodiments of the disclosure have been described above. Compared with conventional technologies in which only the information of the conversation the user is part of is displayed, the solutions provided herein facilitate the user to quickly get knowledge of a group conversation he/she is not part of and thereby facilitate the user to join the group by displaying, in a conversation list of a current user, information of at least one conversation the current user is part of, information of the conversation displayed including a first information set in the corresponding conversation, wherein the conversation comprises a one-to-one conversation of the current user and/or a first group conversation the current user is a group member of; and displaying, in the conversation list, information of at least one second group conversation the current user is not a group member of, information of the second group conversation displayed including a second information set, wherein an amount of information of the second information set is smaller than that of the first information set, so that the conversation list not only displays the information of a conversation the user is part of, but also displays the information of a group conversation the user is not part of.

What have been described above are only illustrations of the preferred embodiments of the disclosure and the technical principles applied thereby. Those skilled in the art should understand that the scope of the disclosure herein is not limited to a technical solution formed by specific combinations of the technical features described supra, which should also encompass other technical solutions formed by any combination of the above technical features or equivalent features without departing from the idea described supra, e.g., a technical solution formed by mutual substitution between the above features and the technical features with similar functions as disclosed (but not limited to) herein.

In addition, although various operations are described in a specific order, it should not be construed such that these operations must be performed in the specific order as illustrated or in a sequential order. In certain circumstances, multi-task parallel processing can be advantageous. Likewise, although a plurality of specific implementation details have been described supra, these details should not be construed as limiting the scope of the disclosure. Some features described within the context of individual embodiments may also be combined to be implemented in a single embodiment. In turn, various features described within the context of a single embodiment may also be implemented in a plurality of embodiments separately or in any appropriate sub-combination manner.

Although the subject matter has been described with languages specific to structural features and/or method logic actions, it would be understood that the subject matter limited in the appended claims is not necessarily limited to the specific features or actions described supra. On the contrary, the specific features and actions described supra are only exemplary forms of implementing the claims.

We claim:

1. A method of displaying conversation information, comprising:
    displaying, in a conversation list of a current user, information of at least one conversation of which the current user is a member, wherein the information of the at least one conversation displayed comprises a first information set of a corresponding conversation among the at least one conversation, wherein the at least one conversation comprises a one-to-one conversation of the current user or a first group conversation of which the current user is a group member, and wherein the first information set comprises information about the corresponding conversation and a message in the corresponding conversation; and
    displaying, in the conversation list, information of at least one second group conversation of which the current user is not a group member, wherein the information of the second group conversation displayed comprises a second information set, wherein an amount of information of the second information set is smaller than that of the first information set, and wherein the second information set comprises information about the second group conversation but comprises no message in the second group conversation.

2. The method of claim 1, wherein the first information set includes information of a message of the corresponding conversation the current user is part of, and the second information set does not include information of a message in the corresponding second group conversation.

3. The method of claim 2, further comprising: displaying, in the conversation list, information of a third group conversation the current user has been a group member of, the information of the third group conversation including a first information set corresponding to the third group conversation; for the current user, after the current user leaves the third group conversation, the third group conversation changes to be the second group conversation; or, before the current user joins the third group conversation, the third group conversation is the second group conversation;

the first group conversation and the second group conversation are both associated with a same team, and the conversation list is a conversation list displayed in a message displaying interface of the team; since a group member set of the first group conversation is equal to a team member set of the team, the messages of the first group conversation are open to all team members; the group member sets of the second group conversation and the third group conversation complete sets or true subsets of the team member set of the team, messages in the second group conversation and the third group conversation are hidden from those team members who are not members of respective group conversations.

4. The method of claim 1, further comprising:
adding, responsive to an operation of joining a second group conversation, the current user as a group member of a target second group conversation indicated by the operation.

5. The method of claim 4, wherein adding, responsive to an operation of joining a second group conversation, the current user as a group member of a target second group conversation indicated by the operation, comprises:
adding, based on a preset operation executed by the current user on a group conversation join control displayed indicative of joining the target second group conversation, the current user to the target second group conversation.

6. The method of claim 5, wherein the group conversation join control and the information of the target second group conversation displayed in the conversation list are simultaneously displayed; or
the group conversation join control is displayed based on the preset operation executed by the current user on the information of the target second group conversation.

7. The method of claim 5, wherein the adding, responsive to an operation of joining a second group conversation, the current user to a target second group conversation indicated by the operation of joining the second group conversation, comprising:
receiving the preset operation executed by the current user indicative of joining the target second group conversation, and sending a join request to a server, so that the server adds the current user as a group member of the target second group conversation, wherein the joint request includes user information of the current user and group conversation information of the target second group conversation; and
receiving feedback information of successful add returned from the server responsive to the join request, and listing, based on the feedback information, the current user as a group member of the target second group conversation.

8. The method of claim 7, wherein adding, by the server, the current user as a group member of the target second group conversation, comprises:
directly adding the current user as a group member of the target second group conversation, and sending group member update information to respective members of the target second group conversation.

9. The method of claim 4, wherein the adding, responsive to an operation of joining a second group conversation, the current user as a group member of a target second group conversation indicated by the operation, comprises:
displaying, responsive to an operation of the current user on joining the target second group conversation, a verification information input box; and
adding, based on an authentication result with respect to verification information inputted in the verification information input box, the current user to the target second group, or displaying prompt information of authentication failure.

10. The method of claim 9, wherein the adding, based on an authentication result with respect to verification information inputted in the verification information input box, the current user to the target second group, or displaying prompt information of authentication failure, comprises:
sending, to a target object, the verification information inputted by the current user via the verification information input box; and
adding, responsive to receipt of authentication success information returned from the target object with respect to the verification information, the current user as a group member of the target second group conversation; or, displaying, responsive to receipt of authentication failure information returned from the target object with respect to the verification information, prompt information of authentication failure.

11. The method of claim 1, wherein the conversation list is a team conversation list displaying information of a group conversation associated with a team the current user is a group member of; wherein the team has an associated team member set and at least one group, and each group of the associated at least one group includes at least part of members of the team member set.

12. The method of claim 11, wherein:
for information of each group conversation displayed in the team conversation list: if the current user is a group member of the group conversation, the information of the group conversation displayed includes information of a message in the group; if the current user is not a group member of the group, the information of the group conversation displayed does not include information of a message in the group; and
the team conversation list further displaying information of a one-to-one conversation between the current user and a team member, the information of the one-to-one conversation displayed including information of a message in the one-to-one conversation.

13. The method of claim 1, wherein a preset association relationship is present between members of the second group conversation and the current user.

14. The method of claim 13, wherein the preset association relationship comprises:
identically between an attribute value of an organizational attribute of the group members of the second group and an attribute value of an organizational attribute of the current user.

15. An electronic device, comprising:
one or more processors; and
a storage device having one or more programs stored thereon;

wherein when the one or more programs are executed by the one or more processors, cause the processor to:

display, in a conversation list of a current user, information of at least one conversation of which the current user is a member, wherein the information of the at least one conversation displayed comprises a first information set of a corresponding conversation among the at least one conversation, wherein the at least one conversation comprises a one-to-one conversation of the current user or a first group conversation of which the current user is a group member, and wherein the first information set comprises information about the corresponding conversation and a message in the corresponding conversation; and display, in the conversation list, information of at least one second group conversation of which the current user is not a group member, wherein the information of the second group conversation displayed comprises a second information set, wherein an amount of information of the second information set is smaller than that of the first information set, and wherein the second information set comprises information about the second group conversation but comprises no message in the second group conversation.

16. The electronic device of claim 15, wherein the first information set includes information of a message of the corresponding conversation the current user is part of, and the second information set does not include information of a message in the corresponding second group conversation.

17. The electronic device of claim 15, the processor is further caused to:

add, responsive to an operation of joining a second group conversation, the current user as a group member of a target second group conversation indicated by the operation.

18. The electronic device of claim 15, wherein the conversation list is a team conversation list displaying information of a group conversation associated with a team the current user is a group member of, wherein the team has an associated team member set and at least one group, and each group of the associated at least one group includes at least part of members of the team member set.

19. The electronic device of claim 15, wherein a preset association relationship is present between members of the second group conversation and the current user.

20. A non-transitory computer-readable storage medium with a computer program stored thereon, wherein the program, when being executed by a processor, cause the processor to:

display, in a conversation list of a current user, information of at least one conversation of which the current user is a member, wherein the information of the at least one conversation displayed comprises a first information set of a corresponding conversation among the at least one conversation, wherein the at least one conversation comprises a one-to-one conversation of the current user or a first group conversation of which the current user is a group member, and wherein the first information set comprises information about the corresponding conversation and a message in the corresponding conversation; and display, in the conversation list, information of at least one second group conversation of which the current user is not a group member, wherein the information of the second group conversation displayed comprises a second information set, wherein an amount of information of the second information set is smaller than that of the first information set, and wherein the second information set comprises information about the second group conversation but comprises no message in the second group conversation.

* * * * *